S. M. FORD.
METHOD OF MANUFACTURING PREPARED ROOFING.
APPLICATION FILED SEPT. 26, 1917.

1,294,785.

Patented Feb. 18, 1919.
3 SHEETS—SHEET 2.

INVENTOR
Silas M Ford
by C. D. Enochs
ATTORNEY

S. M. FORD.
METHOD OF MANUFACTURING PREPARED ROOFING.
APPLICATION FILED SEPT. 26, 1917.

1,294,785.

Patented Feb. 18, 1919.
3 SHEETS—SHEET 3.

INVENTOR
Silas M Ford
by C D Enochs
ATTORNEY

UNITED STATES PATENT OFFICE.

SILAS M. FORD, OF ST. PAUL, MINNESOTA.

METHOD OF MANUFACTURING PREPARED ROOFING.

1,294,785.  Specification of Letters Patent.  Patented Feb. 18, 1919.

Original application filed February 3, 1916, Serial No. 76,050. Divided and application filed October 6, 1916, Serial No. 124,184. Divided and this application filed September 26, 1917. Serial No. 193,398.

*To all whom it may concern:*

Be it known that I, SILAS M. FORD, a citizen of the United States, and a resident of St. Paul, in the county of Ramsey and State of Minnesota, have invented certain new and useful Improvements in Methods of Manufacturing Prepared Roofing, of which the following is a specification.

This application refers to a method of manufacturing prepared roofing, and is a divisional of my co-pending application Serial No. 124,184, filed Oct. 6, 1916, method of manufacturing prepared roofing, which, in turn, was a divisional of my co-pending case, Serial No. 76050, filed February 3, 1916, for method of manufacturing prepared roofing.

This invention relates more particularly to a method of making prepared roofing in the form of shingle strips or single shingles, in which water-proofing compound is so deposited and formed that the completed shingle strips or shingles will have a greater thickness at the bottom of the shingle formation than at the top thereof.

With this and incidental objects in view, the invention consists of certain sequences of operations, the essential elements of which are hereinafter described with reference to the drawings which accompany and form a part of this specification.

Figure 1:
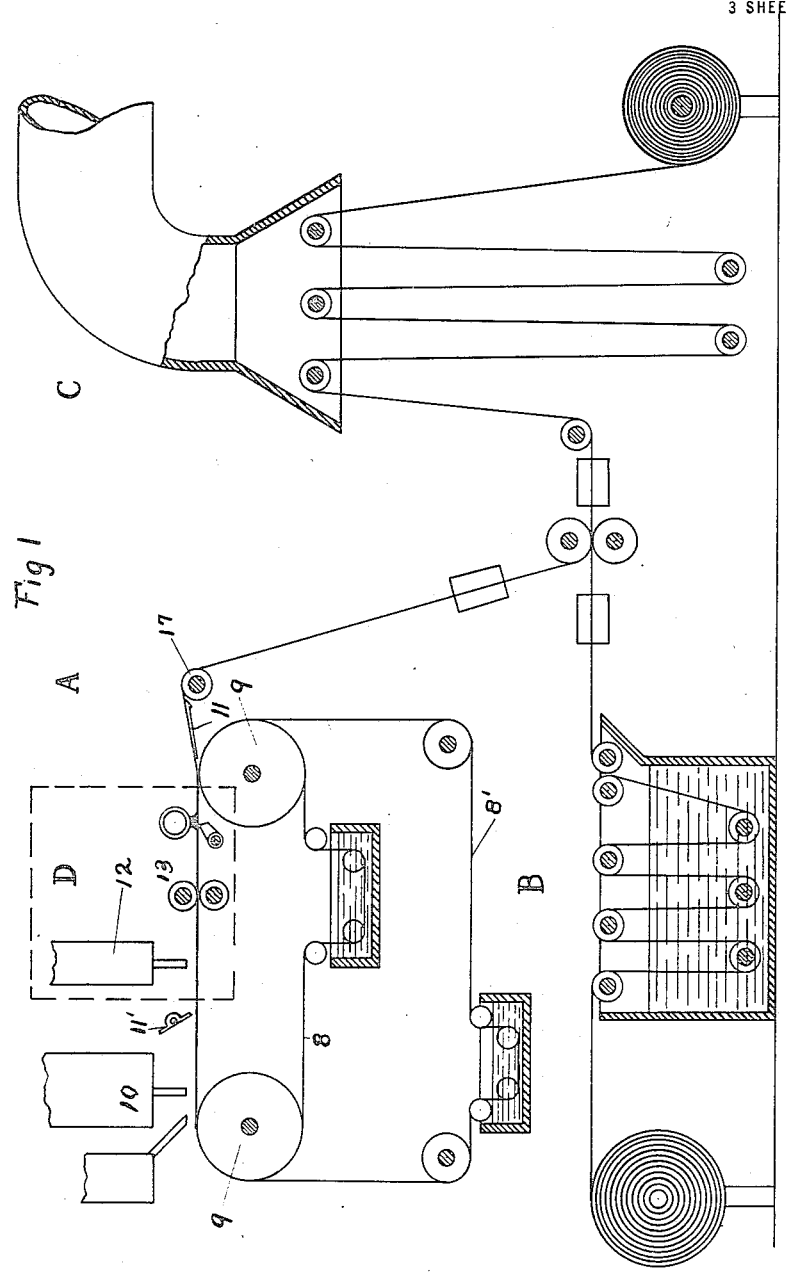
Figure 2:
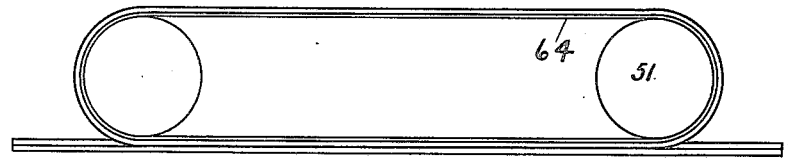
Figure 3:
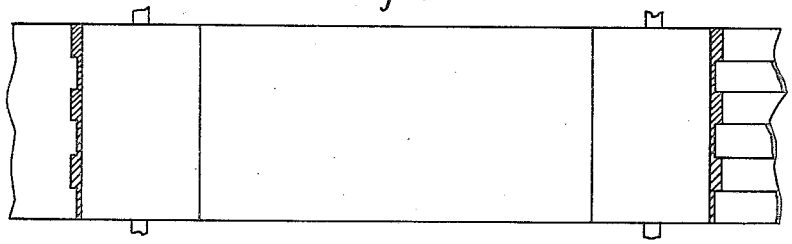
Figure 4:
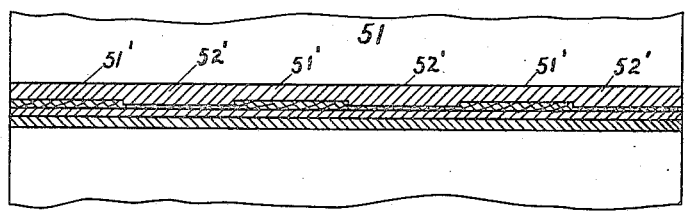
Figure 5:
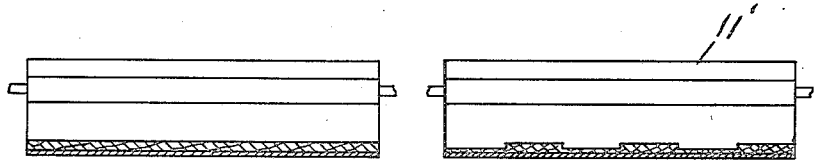
Figure 6:
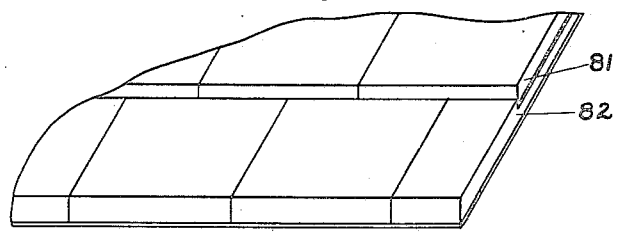
Figure 7:
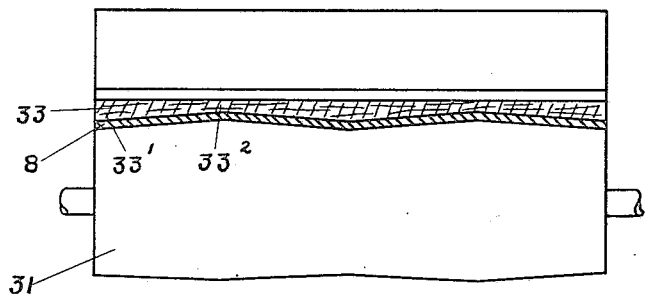

In the drawings, Figure 1 is a schematic view of the construction used in my general method of preparing improved roofing. Fig. 2 is a side elevation of a conventional construction utilized in making roofing paper, varying in thickness in different strips. Fig. 3 is a section taken on the axis of the pulleys shown in Fig. 2. Fig. 4 is a section taken through the axis of a pair of rollers (with the major portions of the rollers broken away) used in making prepared roofing of different thicknesses in different strips of sheets. Fig. 5 is a plan view of two styles of scrapers. Fig. 6 is an isometric view of a portion of a roof laid with shingles cut from roofing sheets having some portions of the sheet thicker than other portions, and Fig. 7 is a view, partly in section, of a pair of specially prepared rollers used in forming water-proof sheets with sections of different thicknesses.

In the drawings Fig. 1 discloses a machine A for making the water-proof sheets hereinafter described; a machine B for water-proofing the foundation sheet, and a machine C for joining and drying the two sheets thus formed.

As the method of operation of this set of machines is fully described in my co-pending applications aforesaid, it will not be elaborated upon here.

In making certain classes of prepared roofing to be used in making shingles, it is desirable to have the sheet thicker in some portions than in others, so that shingles or shingle strips may be made therefrom wherein the bottom of the shingle strips will be thicker than the top.

Such shingles may be made in two different styles; first, a shingle where the butt is thicker than the top, the thickness diminishing gradually from the butt to the top; second, where approximately half of the shingle at the butt is of a uniform thickness, and the half at the top is also of a uniform thickness which is less than that of the lower half.

In forming the prepared roofing for the first named style, I use a pair of specially formed rollers, such as 31, Fig. 7, in place of the rollers 9, shown in the machine A, Fig. 1. Fig. 7 shows partly in section such a pair of rollers with the belt 8 and the water-proof compound formed thereon.

The belt 8 is stretched tightly so as to follow the contour of the rollers, and the water-proof compound deposited on the belt from the reservoir 10, Fig. 1, will tend to flow so as to seek a level, as shown in Fig. 7, at 33, leaving the compound thicker at 33' than at 33²; the rollers 13 in the machine will, of course, tend to assist the natural tendency of the compound to seek its level and set itself in the shape as disclosed in the cross section in Fig. 7, and in case I am using a mineral coating from the reservoir 12, Fig. 1, I would use an additional pair of rollers just beyond the scraper 11.

In making the second style of roofing to be cut into shingles of different thicknesses in different parts of the shingle, I employ a pair of rollers similar to those disclosed in Fig. 4, which is a section taken through the axis of the two rollers, with the major portions of the rollers broken away to better show the contour of the surfaces of the rollers.

The upper roller 51 has a smaller diameter at the portions 51' than at the portions 52', and this pair of rollers would be placed in the position on the belt 8 in the machine A, Fig. 1, occupied by the scraper 11.

I also use a scraper 11' to accomplish the same result as the rollers 51 and 52, the scraper 11 used in the machine A, Fig. 1, being shown in a front view in Fig. 5, and as used to form different thicknesses of waterproofing sheet being shown as 11', Fig. 5, the result being obvious.

I also obtain the same result by running the belt 64, Fig. 2, over the pulley 51, in this case the pulley being of uniform diameter throughout, but the belt of different thicknesses along its longitudinal strips, as shown in Fig. 3, which is a cross section taken to show the varying thickness of the belt.

When shingles cut from roofing strips made in this manner are laid upon a roof, the appearance is as shown in Fig. 6, the butt 81 of the upper shingle resting snugly in the corner formed at 82 in the lower shingle.

It is apparent that mineral surfacing of various natures may be applied to shingles or shingle strips formed in this style, as will be evident to those skilled in the art.

While in describing my method, I have set up a certain series of operations and shown a specific type of machine, I do not wish it understood that I limit myself in this manner, as it is evident that the invention may be varied in many ways within the scope of the following claims.

Claims:

1. The method of manufacturing roofing material wherein a water-proof sheet is formed by depositing on a heat resisting surface a water-proof compound of varying thickness, the sheet so formed removed from the heat resisting surface and then joined to a foundation sheet, and the resultant sheet then cut into shingle strips so the shingles of the shingle strips will taper from a butt, of a given thickness, to the top, of lesser thickness.

2. The method of manufacturing roofing material, wherein a water-proof sheet is formed by depositing on a surface a water-proof compound of varying thicknesses, the sheet of water-proof compound so formed then being removed from the surface, the water-proof compound then joined to a foundation sheet, and the resultant sheet then cut into shingle strips so the shingles of the shingle strips will have butts of greater thickness than the tops thereof.

3. The method of manufacturing roofing material, wherein a water-proof sheet is formed by depositing on a surface a water-proof compound of varying thicknesses, the sheet so formed then removed from said surface, and then joining the water-proof compound sheet so formed to a foundation sheet.

4. The method of manufacturing roofing material, wherein a water-proof sheet is formed by depositing on a traveling heat resisting surface a water-proof compound of varying thicknesses, the sheet so formed then removed from said surface and thereafter joined to a foundation sheet separately prepared.

5. The method of manufacturing roofing material, wherein a water-proof sheet is formed by depositing on a surface a water-proof compound, working the compound down to varying thicknesses at different parts of the sheet, the sheet so formed removed from said water-proof sheet and then being joined to a foundation sheet separately prepared.

6. The method of manufacturing roofing material, wherein a water-proof sheet is formed by depositing on a surface a water-proof compound, working the compound down to varying thicknesses at different parts of the sheet, the sheet so formed removed from said surface and then being joined to a foundation sheet separately prepared, and the resultant sheet then cut into shingle strips so that the shingle strips will taper from a butt, of a given thickness, to the top, of lesser thickness.

SILAS M. FORD.